United States Patent
Lampin et al.

(10) Patent No.: US 9,826,550 B2
(45) Date of Patent: Nov. 21, 2017

(54) COMMUNICATIONS METHOD, A COMMUNICATIONS MANAGEMENT METHOD, AND ASSOCIATED DEVICES AND NODES

(71) Applicant: Orange, Paris (FR)

(72) Inventors: Quentin Lampin, Grenoble (FR); Dominique Barthel, Bernin (FR); Isabelle Auge-Blum, Lyons (FR); Fabrice Valois, Lyons (FR)

(73) Assignee: ORANGE, Paris (FR)

( * ) Notice: Subject to any disclaimer, the term of this patent is extended or adjusted under 35 U.S.C. 154(b) by 300 days.

(21) Appl. No.: 14/432,003

(22) PCT Filed: Sep. 24, 2013

(86) PCT No.: PCT/FR2013/052236
§ 371 (c)(1),
(2) Date: Mar. 27, 2015

(87) PCT Pub. No.: WO2014/049258
PCT Pub. Date: Apr. 3, 2014

(65) Prior Publication Data
US 2015/0264711 A1    Sep. 17, 2015

(30) Foreign Application Priority Data
Sep. 28, 2012  (FR) ...................................... 12 59195

(51) Int. Cl.
*H04J 3/00*    (2006.01)
*H04W 74/02*    (2009.01)
(Continued)

(52) U.S. Cl.
CPC ....... *H04W 74/02* (2013.01); *H04W 72/0446* (2013.01); *H04W 72/06* (2013.01);
(Continued)

(58) Field of Classification Search
None
See application file for complete search history.

(56) References Cited

U.S. PATENT DOCUMENTS

| 8,416,750 | B1 * | 4/2013 | Vargantwar ....... H04W 72/1242 370/329 |
| 2004/0047319 | A1 * | 3/2004 | Elg ........................ H04W 74/02 370/338 |

(Continued)

FOREIGN PATENT DOCUMENTS

| WO | 2011022577 A1 | 2/2011 |
| WO | 2012001266 A1 | 1/2012 |

OTHER PUBLICATIONS

International Search Report and Written Opinion dated Jan. 9, 2014 for corresponding International Application No. PCT/FR2013/052236, filed Sep. 24, 2013.

(Continued)

*Primary Examiner* — Kibrom T Hailu
(74) *Attorney, Agent, or Firm* — David D. Brush; Westman, Champlin & Koehler, P.A.

(57) ABSTRACT

A data communication method implemented by a sensor node of a telecommunications network including a plurality of sensor nodes and a concentrator node, which share a communication channel. The method includes: selecting a time interval in a contention window including a plurality of time intervals and preceding a transmission period including a plurality of transmission intervals; emitting a request signal during the selected time interval to the concentrator node; receiving a response signal carrying encoded information representing an ordered combination of the intervals marked during which the signals were received by the concentrator node; determining a transmission rank according to a number of intervals marked by the concentrator node; and deciding to emit data to the concentrator node in (Continued)

the transmission period when the transmission rank is lower than or equal to the number of intervals of the transmission period.

15 Claims, 6 Drawing Sheets

(51) Int. Cl.
| | |
|---|---|
| H04W 74/08 | (2009.01) |
| H04W 72/04 | (2009.01) |
| H04W 72/06 | (2009.01) |
| H04W 84/18 | (2009.01) |

(52) U.S. Cl.
CPC ....... *H04W 74/08* (2013.01); *H04W 74/0816* (2013.01); *H04W 84/18* (2013.01)

(56) References Cited

U.S. PATENT DOCUMENTS

| | | | | |
|---|---|---|---|---|
| 2004/0137906 A1* | 7/2004 | Nakao | ............... | H04W 16/28 455/450 |
| 2006/0105773 A1* | 5/2006 | Lin | ............... | H04W 74/02 455/452.1 |
| 2009/0022174 A1* | 1/2009 | Wang | ............... | H04W 74/08 370/462 |
| 2009/0141738 A1* | 6/2009 | Li | ............... | H04L 12/413 370/448 |
| 2009/0300379 A1* | 12/2009 | Mian | ............... | G01D 9/005 713/300 |
| 2009/0323716 A1* | 12/2009 | Chintalapudi | .... | H04W 74/0841 370/461 |
| 2010/0020770 A1* | 1/2010 | Qin | ............... | H04N 21/2381 370/336 |
| 2013/0100941 A1 | 4/2013 | Lampin et al. | | |

OTHER PUBLICATIONS

Fujiwara A. et al., "Centralized Channel Allocation Technique to Alleviate Exposed Terminal Problem in CSMA/CA-Based Mesh Networks—Solution Employing Chromatic Graph Approach" IEICE Transactions on Communications, Communications Society, Tokyo, JP, vol. E88-B, No. 3, Mar. 1, 2005 (Mar. 1, 2005), pp. 958-964, XP001225572.

Kyle Jamieson et al., "Sift: A MAC Protocol for Event-Driven Wireless Sensor Networks", Jan. 1, 2006 (Jan. 1, 2006), Wireless Sensor Networks Lecture Notes in Computer Science; LNCS, Springer, Berlin, DE, pp. 260-275, XP019027949.

English translation of the Written Opinion dated Mar. 28, 2015 for corresponding International Patent Application No. PCT/FR2013/052236, filed Sep. 24, 2013.

* cited by examiner

COMMUNICATIONS METHOD, A COMMUNICATIONS MANAGEMENT METHOD, AND ASSOCIATED DEVICES AND NODES

1. CROSS-REFERENCE TO RELATED APPLICATIONS

This Application is a Section 371 National Stage Application of International Application No. PCT/FR2013/052236, filed Sep. 24, 2013, the content of which is incorporated herein by reference in its entirety, and published as WO 2014/049258 on Apr. 3, 2014, not in English.

2. FIELD OF THE INVENTION

The field of the invention is that of telecommunications. The invention relates more particularly to a protocol for use by one or more nodes in a communications network to access a communications medium or channel.

In a telecommunications network having a plurality of nodes sharing a common communications medium, simultaneous transmissions can interfere, thereby leading to collisions and to the loss of packets. This applies in particular in wireless networks such as meshed wireless networks, WiFi local networks, or lossy and low power networks (LLNs).

Numerous media access control (MAC) protocols have been designed to cope with this problem. In particular, the IEEE-802.11 family of protocols relates to WiFi local networks and the IEEE-802.15.4 family of protocols relates to wireless personal networks.

The development of networks of wireless sensors has given rise to a new constraint in the design of a MAC protocol, namely that of efficiency in terms of energy consumption. Thus, so-called low power listening (LPL) MAC protocols have been designed. In this type of protocol, the nodes sleep for long periods, and a transmitter/receiver pair of nodes can be selected to communicate during a wake period. The collision avoidance mechanisms proposed for these protocols may be classified in two categories: deterministic mechanisms and probabilistic mechanisms.

Deterministic mechanisms are based on a pre-established schedule in which each logic channel is dedicated to a specific node. Such mechanisms adapt poorly to unpredictable traffic or else they require the schedules to be revised frequently, thereby leading to high energy consumption. Furthermore, extensibility is not guaranteed since any one particular node can only use the channel that is allocated thereto.

Probabilistic mechanisms are mainly based on a carrier sense multiple access (CSMA) mechanism. In particular, a plurality of protocols make use of the nodes sharing knowledge about time in order to determine, during a fixed contention window, which node is to be allowed to transmit during the following wake period.

The invention relates more particularly to probabilistic mechanisms.

3. PRIOR ART

International patent application WO 2012/001266 discloses a communications method in which a node seeking to transmit data during the next transmission period selects a time slot j in a contention window preceding the transmission period, listens to the time slots preceding the selected slot j, and counts the number of transmissions during those slots. When the number of transmissions is less than or equal to a predetermined threshold, the node transmits during the time slot j and selects one of the transmission channels of the transmission period as a function of the number of transmissions it has counted. Otherwise, when the number of transmissions counted is greater than the predetermined threshold, it postpones its data transmission to a forthcoming transmission period.

That method thus enables each node to plan its transmissions locally over time.

4. DRAWBACKS OF THE PRIOR ART

Such a method is well adapted to a sensor network that is small, in which each sensor is in a position to listen to all of the other sensors.

In contrast, it is not applicable to a network of sensor nodes that are not all within radio range of one another, in particular because they are located in zones where radio signals are strongly attenuated. This can apply for example to sensors buried under a slab of concrete. It can also apply to a network of large size in which the sensors are too far apart from one another.

When the sensor nodes are not within radio range of one another, it is known to have recourse to a sensor network that presents an architecture that is centralized, e.g. with star topology, in which a concentrator node having sufficient energy capacity and suitable transmit/receive means is in charge of collecting measurements originated by a plurality of sensors. Such a concentrator node then covers a large geographical area, e.g. on the scale of a small town or a district of a large town.

In such a network, because sensor-to-sensor communications are not guaranteed, the above-described communications method cannot be implemented in reliable manner. Furthermore, because the sensors transmit their data to a common concentrator node, the risk of collisions is high.

Finally, there exist applications, e.g. such as those for managing a carpark, that require information to be signaled shortly after it is collected (e.g. because a parking space has just become available). It is therefore desirable for the sensors to have access to the communications channel without delay.

5. SUMMARY OF THE INVENTION

The invention improves the situation with the help of a communications method executed by a sensor node in a telecommunications network having a plurality of sensor nodes and a concentrator node, said sensor node being suitable for transmitting data to the concentrator node over a broadcast communications medium that it shares with the plurality of sensor nodes.

According to the invention, the method comprises the following steps that are to be performed when the sensor node has data for transmitting to the concentrator node:
  selecting a time slot j in a contention window having a plurality of time slots and preceding a transmission period having a plurality of transmission channels;
  broadcasting a request signal in the selected time slot j;
  receiving an answer signal comprising coded information representative of an ordered combination of slots of the contention window marked as slots during which at least one signal was received by the concentrator node;
  determining a transmission rank on the basis of the received coded information, which rank is at least a function of the number of slots marked by the concentrator node among the time slots preceding the time slot j; and deciding to transmit data in the transmission period when the determined transmission rank is less than or equal to the number of channels of said period.

In the invention, a sensor node that has data for transmission to the concentrator node of the network over a communications channel shared with the plurality of sensor nodes participates in a competition in a contention window preceding the next transmission period. It selects a time slot j in the window and marks the time slots it has selected by transmitting a request signal in that time slot to the concentrator node.

At the end of the contention window, it, together with all of the other nodes, receives an answer signal from the concentrator node, which answer signal conveys coded information representative of an ordered combination of time slots in the contention window for which the concentrator node has received a transmission request signal from one or more sensor nodes.

On the basis of the coded information, the sensor node deduces its transmission rank.

When this rank is less than the number of channels in the transmission period, it decides to transmit in the transmission period, e.g. in the transmission channel corresponding to its rank.

When the rank is greater than or equal to the number of channels, it decides to postpone transmission to a forthcoming transmission period.

Thus, the invention relies on an approach that is entirely novel and inventive for enabling sensor nodes to access a communications channel in a centralized architecture, whereby a sensor node in competition obtains a unique common answer signal that is broadcast to all of the participating sensor nodes, and from which it deduces the transmission rank that is available to it.

The invention thus makes it possible to solve the technical problem of no communication between the various sensor nodes, while conserving the advantages of a competition between those nodes that seek to transmit data, and while minimizing the cost of the signaling exchanged between the concentrator node and the plurality of sensor nodes.

According to an aspect of the invention, the determination step comprises both a substep of resolving the received coded information into K components of an M-ary orthogonal basis vector with integer M greater than or equal to 2, of dimension K, with K being a non-zero integer equal to the number of time slots of the contention window, and also a substep of interpreting the K components that are obtained, in which the $k^{th}$ slot is interpreted as being marked when the $k^{th}$ component has a value greater than zero.

An advantage is that the coded information is simply a number that can be resolved in a unique manner and on the basis of which the sensor node can obtain the number of slots in the contention window that have been marked by the concentrator node together with their ranks. The answer signal transmitted by the concentrator node is thus very inexpensive to transmit.

According to an aspect of the invention, if M has a value equal to 2, the slot is interpreted as being marked, when the $k^{th}$ component has a value equal to 1.

An advantage is that the coded information is very simple to resolve. The sensor node can determine very easily whether it can transmit in the forthcoming transmission period or whether it needs to postpone its transmission to the following period.

According to an aspect of the invention, if M has a value strictly greater than 2, the request signal broadcast by the sensor node is carried by an $m^{th}$ waveform from among M predetermined waveforms, and the transmission rank is also determined as a function of the number of waveforms received in a given time slot.

An advantage is that the sensor node also obtains information about the number of sensor nodes that have marked the same time slot as itself. In particular it can deduce therefrom its real rank and it can avoid collisions that would otherwise occur by a plurality of sensor nodes using the same transmission channel.

Advantageously, the sensor node selects the predetermined waveform that is to carry its request message in random manner from among a plurality M of predetermined waveforms.

In an aspect of the invention, the method includes a prior step of receiving a contention window announcement signal coming from the concentrator node.

An advantage of such synchronization on the fly is that the sensor nodes have no need to share knowledge about time beforehand.

The invention also provides a method of managing communications in a network comprising a concentrator node and a plurality of sensor nodes, the plurality of sensor nodes being suitable for transmitting data to the concentrator node over a broadcast communications medium that they share, said method being executed by the concentrator node.

According to the invention, the management method comprises the following steps:

listening to the communications medium in order to detect at least one signal received in a contention window having a plurality of slots;

marking time slots of the contention window in which at least one received signal is detected;

at the end of the contention window, coding information representative of an ordered combination of the marked slots; and broadcasting an answer signal comprising said coded information.

Such a method is advantageously performed by the concentrator node that is suitable for listening to the plurality of sensor nodes of the communications network.

In an aspect of the invention, the coded information is obtained by combining components of an M-ary orthogonal basis of dimension K equal to the number of time slots of the contention window, the $k^{th}$ component being set to a value greater than or equal to 1 when the $k^{th}$ slot is marked, or else being set to zero.

An advantage is that the coded information is broadcast to the nodes after the competition and it enables each of the nodes to determine its transmission rank.

In an aspect of the invention, when M has a value equal to 2, the $k^{th}$ component is set to the value 1 when the $k^{th}$ slot is marked, or else it is set to zero.

The advantage of an M-ary orthogonal resolving basis is that it makes it possible using only a number to code all of the information needed by each sensor node in order to determine its transmission rank.

According to another aspect of the invention, when M has a value strictly greater than 2, the listening step comprises detecting at least one signal carried by an $m^{th}$ waveform selected from a plurality of M predetermined waveforms, and, in the information coding step, the value of $k^{th}$ component is obtained by an ordered combination of M subcomponents of an orthogonal basis, the $m^{th}$ subcomponent being equal to 1 when the $m^{th}$ waveform has been detected.

Under such circumstances, when the concentrator node detects the received signals, it is capable of distinguishing between their various waveforms. The M-ary base with M>2 makes it possible for the coded information to have added thereto information about the waveforms detected in each slot of the contention window.

The invention also provides a communications device for a sensor node of a telecommunications network comprising a plurality of sensor nodes and a concentrator node, said sensor node being suitable for transmitting data to the concentrator node over a broadcast communications medium that it shares with the plurality of sensor nodes.

According to the invention, the device is suitable for implementing the following units when the sensor node has data for transmitting to the concentrator node:

selecting a time slot j in a contention window having a plurality of time slots and preceding a transmission period having a plurality of transmission channels;

broadcasting a request signal in the selected time slot j;

receiving an answer signal comprising coded information representative of an ordered combination of slots of the contention window marked as being slots during which at least one signal was received by the concentrator node;

determining a transmission rank on the basis of the received coded information, which rank is determined as a function of a number of slots marked by the concentrator node from among the time slots preceding the time slot j; and deciding to transmit data in the transmission period when the determined transmission rank is less than or equal to the number of channels in the transmission period.

Such a device is suitable for performing the communications method of the invention as described above in its various aspects.

Advantageously, the device may be incorporated in a sensor node.

The invention thus also provides a sensor node suitable for implementing the above-described communications device.

The invention also provides a device for managing communications in a network comprising a concentrator node and a plurality of sensor nodes, the plurality of sensor nodes being suitable for transmitting data to the concentrator node over a broadcasting communications medium that they share, said device being suitable for implementing the following units:

listening to the communications medium in order to detect at least one signal received in a contention window having a plurality of time slots;

marking time slots of the contention window in which at least one received signal is detected;

at the end of the contention window, coding information representative of an ordered combination of marked slots; and broadcasting an answer signal comprising said coded information.

Such a device is suitable for performing the management method of the invention as described above in its various aspects.

Advantageously, the device may be incorporated in a concentrator node.

The invention thus also provides a concentrator node suitable for implementing the above-described management device.

The invention also provides a communications network having a plurality of sensor nodes and a concentrator node of the invention.

The advantages and characteristics described with reference to the communications method and to the management method apply in corresponding manner to the sensor node, to the concentrator node, and to the communications network in question.

The invention also provides a computer program having instructions for executing steps of the above-described communications method when said program is executed by a computer.

The invention also provides a computer program including instructions for executing steps of the above-described management method when said program is executed by a computer.

These programs may use any programming language, and be in the form of source code, object code, or code intermediate between source code and object code, such as in a partially compiled form, or in any other desirable form.

The invention also provides a computer-readable data medium or recording medium including instructions of a computer program as mentioned above.

The above-mentioned data medium may be any entity or device capable of storing the program. For example, the medium may comprise storage means such as a read only memory (ROM), e.g. a compact disk (CD) ROM, or a microelectronic circuit ROM, or indeed magnetic recording means, e.g. a floppy disk or a hard disk.

Furthermore, the data medium may corresponding to a transmissible medium such as an electrical or optical signal, suitable for being conveyed via an electrical or optical cable, by radio, or by other means. The program of the invention may in particular be downloaded from an Internet type network.

Alternatively, the data medium may correspond to an integrated circuit in which the program is incorporated, which circuit is suitable for executing or for being used in the execution of the method in question.

6. LIST OF FIGURES

Other advantages and characteristics of the invention appear more clearly on reading the following description of a particular implementation of the invention given merely by way of non-limiting illustrative example, and from the accompanying drawings, in which.

7. DESCRIPTION OF A PARTICULAR IMPLEMENTATION OF THE INVENTION

Figure 1:
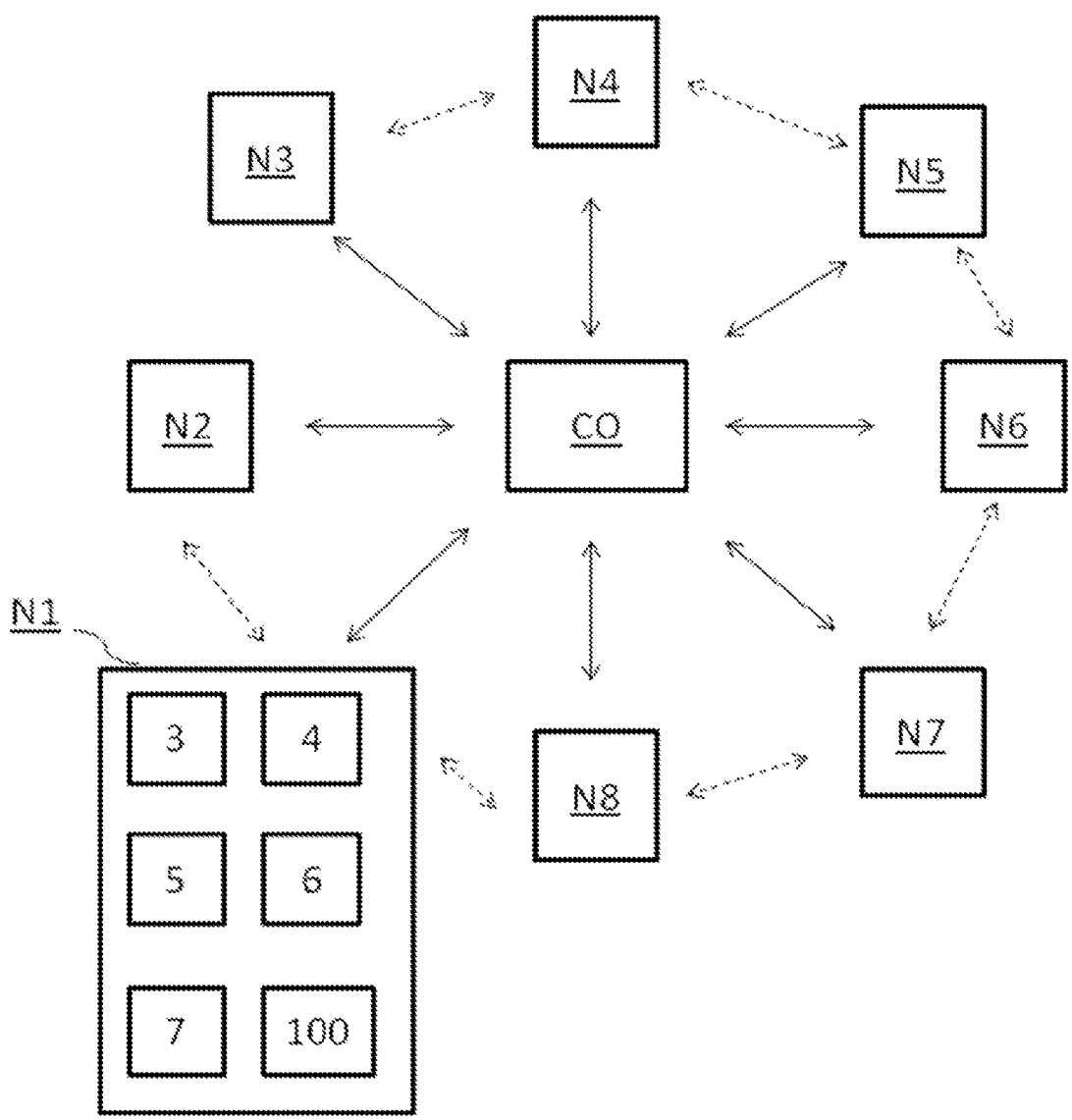
FIG. 1 is a diagrammatic view of a communications network in an implementation of the invention.

FIG. 1 shows a network 2 comprising a plurality of nodes $N_1, N_2, \ldots, N_N$. By way of example, the network 2 is a wireless network of low power sensors, in which the nodes, referred to as sensor nodes, can switch between a sleep state in which they consume little energy and a wake state in which they can send and receive data, in particular data relating to values measured by the sensors. Nevertheless, the invention is not limited to this type of network and it may in particular relate to a network of links over any kind of shared communications channel.

Each node Ni presents the hardware architecture of a computer. One of the nodes $N_1$ is shown in greater detail in FIG. 1 and comprises a microprocessor 3, a ROM 4, a random access memory (RAM) 5, a communications interface 6, and an inlet port 7. The microprocessor 3 serves to execute programs stored in the ROM 4 while using the RAM 5. The communications interface 6 serves to communicate by wireless links with the other nodes 1 of the network 2. Finally, the inlet port 7 makes it possible to acquire the value of a measurement signal.

The ROM 4 constitutes a data medium that is readable by the microprocessor 3. In an embodiment of the invention, it contains computer program instructions having the main steps shown in the form of a flow chart in FIG. 4 for the purpose of executing a communications method in a first implementation of the invention, as performed by the node Ni.

Advantageously, the node Ni includes a communications device 100 constituting a second embodiment of the invention, as described below with reference to FIG. 6.

Periodically, or as a function of the value of the measurement signal acquired via its inlet port 7, each node Ni decides to transmit data over the network 2. In order to avoid collisions and losses of packets, each node Ni performs a collision avoidance mechanism as described in greater detail below.

Figure 2:
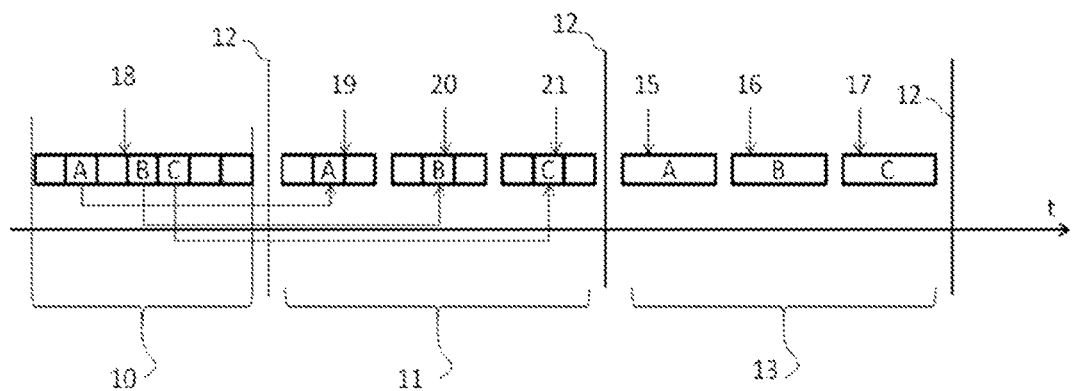
FIG. 2 shows an example of the conduct of communications in the FIG. 1 network in an implementation of the invention.

FIG. 2 shows as a function of time how communications are conducted over the network 2 for a sensor node Ni of the communications network 2. The nodes Ni have shared knowledge about time t. They are thus capable of switching periodically into their wake state at instants 12 that are common for all of the nodes Ni. This knowledge may be pre-established or it may be acquired on the fly. The conduct of communications comprises two stages 10, 11 that precede an instant 12 of switching to the wake state, and one stage 13 that follows the instant 12.

The stages 10 and 11 seek to determine which nodes Ni are to be authorized to transmit. Finally, the stage 13 is a transmission period during which the nodes Ni that are authorized to transmit actually transmit their data.

The transmission period of stage 13 presents a plurality of transmission channels. In the example shown in FIG. 2, the transmission period has three transmission channels 15, 16, and 17 that are time multiplexed. In a variant, the transmission period could have a greater or smaller number of transmission channels. Also in a variant, the transmission channels could be frequency multiplexed.

The stages 10 and 11 serve to implement a two-part collision avoidance mechanism having the purpose of selecting the three nodes Ni that are to be authorized to transmit in the respective transmission channels 15, 16, and 17.

Naturally, if the transmission period has a greater or smaller number of transmission channels, then the number of nodes Ni selected during the stages 10 and 11 should is adapted accordingly. The invention relates more particularly to the conductor of stage 10.

Figure 3:
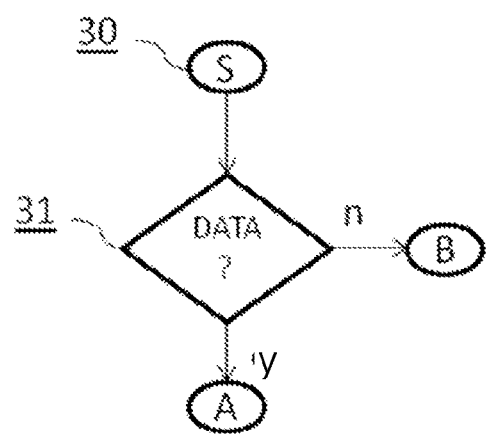
FIG. 3 is a diagrammatic flow chart illustrating the operation of a sensor node.
Figure 4:
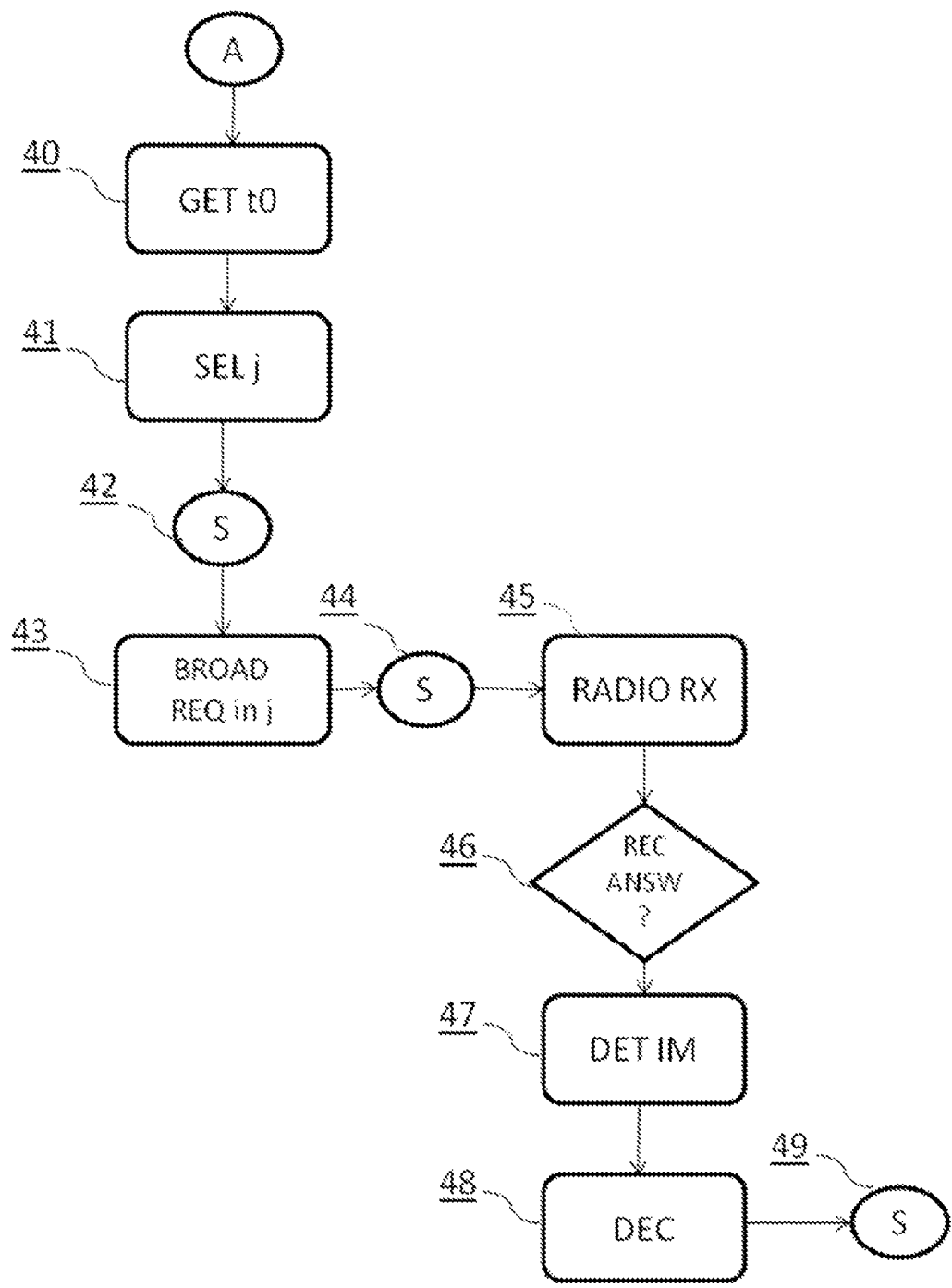
FIG. 4 is a diagrammatic flow chart showing the steps of a communications method in an implementation of the invention.

FIGS. 3 and 4 are flow charts showing the communications method performed by each node Ni enabling communications to be conducted as shown in FIG. 2.

In step 30 of FIG. 3, which precedes stage 10, the node Ni is in its sleep state, represented by the symbol S in the figures. In step 31, the node Ni determines whether it has data for transmission. If the node Ni does not have any data for transmission, it goes back to sleep. If it does have data for transmission, it moves on to step 40 in FIG. 4.

FIG. 4 shows the steps performed by a node Ni that has data for transmission during the stage 10 of FIG. 2 in a first implementation of the invention. The stage 10 enables a first part of the collision avoidance mechanism to be performed by using a contention window 18 that is subdivided into a plurality of time slots. In FIG. 2, the contention window 18 is subdivided into Tf time slots, where Tf is equal to 7. In a variant, the contention window 18 could be divided into a smaller or greater number of time slots.

In step 40, the node Ni obtains an instant t0 for the beginning of the next contention window 18. For example, it receives an announcement signal SA from the concentrator node CO. In step 41, it selects at random one of the time slots j in the contention window 18. The probability function used for selecting the time slot j may be of various types, for example a geometrically increasing distribution of the type described in the document by K. Jamieson, H. Balakrishnan, and Y. C. Tay entitled "Sift: A MAC protocol for event-driven wireless sensor networks", published in EWSN (K. Römer, H. Karl, and F. Mattern, eds.), Vol. 3868 of Lecture Notes in Computer Science, pp. 260-275, Springer, 2006, or it could merely be a uniform distribution.

Thereafter, the node Ni goes back to sleep in step 42 until the beginning of the time slot j of the contention window 18. It wakes at the beginning of the slot j and in step 43 it sends a transmission request signal to the concentrator node CO for marking the slot j. It goes back to sleep in step 44.

At the end of the contention window, the node Ni wakes and listens in a step 45 for any messages received via its communications interface 6, as symbolized by RADIO RX.

In step 46, the node Ni determines whether any of the received messages is an answer signal coming from the concentrator node CO, which is symbolized by "ANSW?".

If it has received an answer message from the concentrator node CO, it extracts from the message coded information representing an ordered combination of slots in the contention window marked as being slots during which the concentrator node received signals from the plurality of sensor nodes.

The sensor node Ni is then capable of determining the number of slots that have been marked prior to the interval j that it selected, and of deducing therefrom the transmission rank Rg that is available to it.

When the transmission rank Rg that is obtained has a value less than a predetermined threshold T, then the node Ni decides that it can transmit in slot number IM+1 of the transmission window. The threshold T corresponds to the number of transmission channels in the transmission period. Thus, T=3 in the example of FIG. 2.

In step 49, the node goes back to sleep and programs waking for the instant at the beginning of transmission in the stage 13 that corresponds to its own rank, i.e. one of the channels 15, 16, or 17.

On the contrary, when the number of marked slots IM that is obtained has a value that is greater than or equal to the threshold T, then the node Ni decides during a step 48 that it cannot transmit during the transmission period 19, and that it will try again during the next competition, e.g. for allocating slots of transmission period 20 or 21. It goes back to sleep in step 49.

Naturally, it can be understood that the coded information in this first implementation is limited to the concentrator node indicating the numbers and the ranks of the marked slots, and that it is silent about the number of nodes that have attempted to mark the same slot in the contention window.

As a result, it is possible that a plurality of nodes Ni have decided simultaneously to transmit in the same time slot j that was selected independently by each of them.

In order to prevent this situation arising, the nodes selected during the first stage of the collision avoidance mechanism may participate in the second stage. These are thus the nodes Ni that have data for transmission and that were able to obtain a transmission rank lower than the threshold T during the stage 10. Thus, each node Ni that participates in the second part has a rank of value lying in the range 1 to T.

As shown in FIG. 2, the second part of the collision avoidance mechanism corresponding to the stage 11 makes use of T contention windows, i.e. three contention windows 19, 20, and 21 in the example shown. The counter c of each node 1 enables it to be assigned to one of the contention windows 19, 20, and 21 for the second part of the of the collision avoidance mechanism.

Thus, in the invention, a selection mechanism is performed in each contention window 19, 20, and 21 serving to select only a single node 1 that is authorized to transmit in the transmission channel 15, 16, or 17 corresponding to the respective contention window 19, 20, or 21. This second part of the collision avoidance mechanism is very useful, since during the first part, a plurality of nodes Ni might have selected the same time slot in step 55, thereby being allocated the same rank.

Thereafter, each of the three nodes Ni authorized to transmit transmits its data over the transmission channel 15, 16, or 17 corresponding to its own contention window 19, 20, or 21. Thus, in the example shown, the node Ni that selected time slot No. 2 during stage 10 and that participated in the mechanism for selecting the contention window 19 during stage 11 transmits its data over the transmission channel 15.

The collision avoidance mechanism also makes it possible to switch each node between its sleep state and its wake state, as a function of needs. Only the nodes Ni having data for transmitting and the concentrator node are in the wake state during transmission. The other nodes therefore consume little energy.

In a second implementation, described in greater detail with reference to FIG. 7, the sensor node Ni broadcasts a request signal REQ using a predetermined waveform selected from a plurality of M predetermined waveforms.

In this implementation of the invention, the coded information that it receives is representative of the concentrator node receiving at least one type of waveform from the plurality of predetermined waveforms. If a plurality of types of waveform are detected by the concentrator node, the node inserts this information in the coded information IC and the sensor node Ni can take account of it when determining its transmission rank. For example, if it selected the second waveform for conveying its request message and if it determines that the first waveform was detected by the concentrator node in the same time slot j as its own time slot, then it needs to shift its transmission rank by one. An advantage of this implementation is that it makes it possible to further limit any risk of collision in a given transmission interval.

Figure 5:
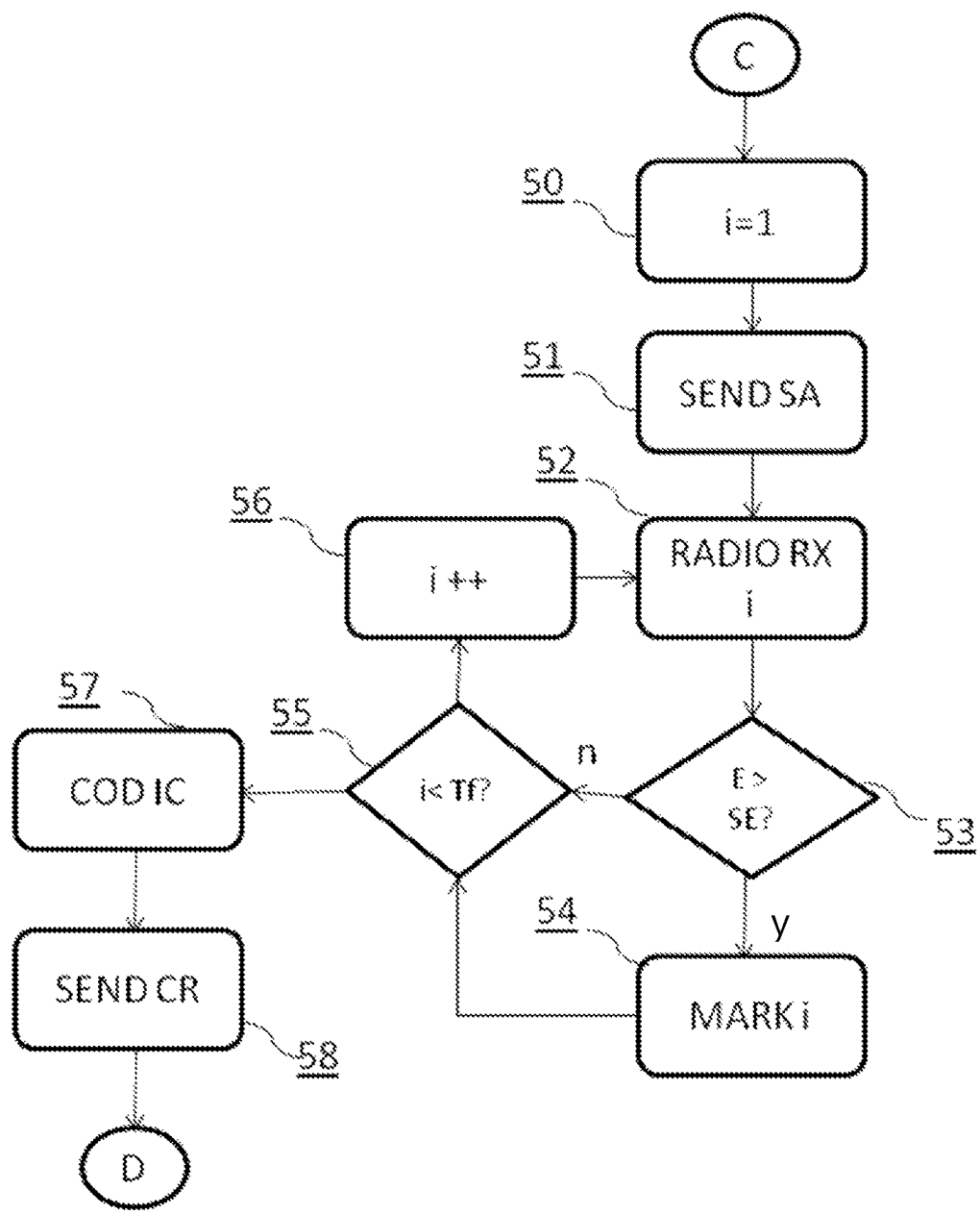
FIG. 5 is a diagrammatic flow chart showing the steps of a management method in an implementation of the invention.

FIG. 5 is a flow chart of steps showing the communications management method executed by the concentrator node CO in a first implementation of the invention and that enables communications to be conducted between a plurality of sensor nodes and the concentrator node as shown in FIG. 2.

At the beginning of the contention window, in a step 50, the concentrator node initializes a variable i to 1. This variable corresponds to the current time slot of the contention window 18. It also initializes to zero a one-dimensional marking table TM(i) of length Tf that is equal to the number of time slots in the contention window 18. The variable i is thus an integer in the range 1 to Tf.

Advantageously, during a step 51, it transmits over its radio interface a start announcement message t0 relating to a forthcoming contention window 18 for the plurality of sensor nodes Ni.

During a step 52, which lasts for the duration of the current time slot i, the concentrator node listens to the signals received over its radio interface, as symbolized by RADIO RX i in FIG. 5. Advantageously, it detects a quantity of energy E received during this current slot i, and if the quantity of energy is greater than a predetermined threshold Se, it decides in a step 53 at the end of this slot that it has received a signal in the current time slot i. In a step 54, it marks the corresponding slot i by setting the variable TM(1) to 1 in the marking table. Otherwise it leaves it at zero.

Thereafter, under all circumstances, in a step 55 it verifies whether the variable i is strictly less than the threshold Tf. If it is, the concentrator node CO increments the value of the current slot i by 1 during a step 56, and then returns to the step 52.

The succession of steps 52 to 56 is thus repeated for each current slot value i so long as i is strictly less than the number of slots Tf.

In a first implementation of the invention, the marking table is filled in as follows:

when k is equal to K−1, the concentrator node CO performs a step 57 of coding the information of the marking table in a binary sequence of length Tf as follows: the $k^{th}$ bit is set to 1 when the slot k has been marked by the concentrator node; else the $k^{th}$ bit is set to zero.

This amounts to projecting the values of the marking table onto an orthogonal binary base of dimension Tf.

Figure 6:
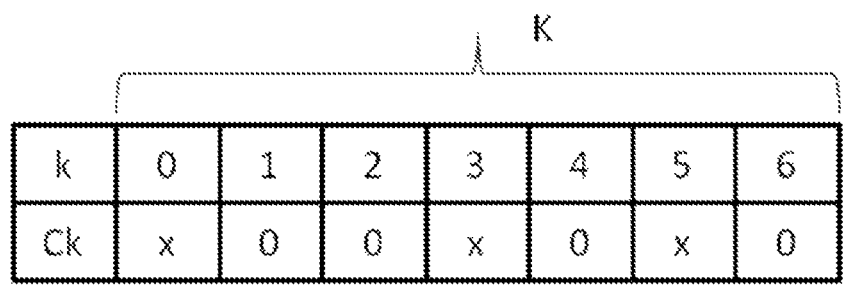
FIGS. 6 and 7 show examples of how the coded information is constructed respectively in first and second implementations of the invention.

In this first implementation of the invention, an example of which is shown in FIG. 6, the information is coded on a binary basis of dimension K equal to the number of slots in the contention window. The node Ni thus resolves the received coded information it has received into K components Ck of a vector of a binary basis of dimension K equal to the number of slots in the contention window and it interprets the resulting components, the $k^{th}$ components being equal to 1 when the slot has been marked by the concentrator node, or else being equal to zero.

The coded information IC is thus obtained by summing the contributions of the K components as follows:

$$IC = \sum_{k=0}^{K-1} C_k \cdot 2^k$$

with $C_k$=f, the indicating function, e.g. being equal to 1 when the slot k is marked, or else $C_k$=0.

In the example of FIG. 6, the slots 0, 3, and 5 have been marked.

The coded information IC received by the sensor nodes thus has the following value in application of the above formula:

$$IC=1\times2^0+1\times2^3+1\times2^5=1+8+32=41$$

From the coded information, the node Ni can determine the number of slots that have been marked by the concentrator node CO and can deduce its own transmission rank. This is made possible by the fact that an orthogonal basis has been used by the concentrator node. The coded information IC is thus resolved without loss of information.

In a second implementation of the invention, the concentrator node CO is capable of distinguishing different waveforms FO as received over its radio interface from a plurality of M predetermined waveforms.

Figure 7:
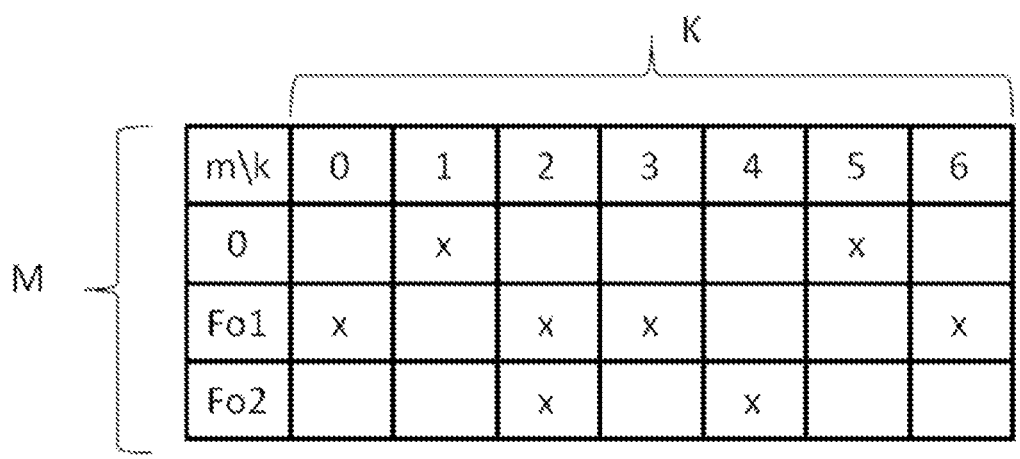

With reference to FIG. 7, there follows a description of an illustrative example of this second implementation.

In this example, consideration is given to first and second distinct waveforms FO1 and FO2.

At the beginning of the contention window, in a step 50, the concentrator node initializes a variable k to 0. This variable corresponds to the current time slot of the contention window 18. It also initializes to zero a two-dimensional marking table TM(k,m) with k lying in the range 0 to K−1, K being equal to the number of slots in the contention window 18, and m lying in the range 0 to M−1, M being equal to the number of waveforms that the concentrator node is capable of distinguishing.

Advantageously, during a step 51, it transmits over its radio interface a start announcement message t0 concerning a forthcoming contention window 18 to the plurality of sensor nodes Ni.

During a step 52 that lasts for the duration of the current slot k, the concentrator node listens to the signals received over its radio interface, with this being symbolized by "RADIO RX i" in FIG. 5. Advantageously, if it detects a signal carried by the first waveform FO1, at the end of this slot, in a step 54, it decides to mark the slot k in question by setting the variable TM(k,1) of the marking table to the value of the indicator function, e.g. equal to 1. Else it leaves it at zero.

If during this same slot k it also detects reception of another signal, this time conveyed by the second waveform FO2, it marks the variable TM(k,2) with the value f.

In contrast, if no signal conveyed by the first or the second waveform is detected, it does not mark any position. It is considered that the value zero in the position TM(k,0) indicates that no signal was detected.

Thereafter, and under all circumstances, in a step 55 it verifies that the variable k is strictly less than the threshold K−1. If so, the concentrator node TO increments the value of the current slot k by 1 during a step 56, and then returns to the step 52.

The succession of steps 52 to 56 is thus repeated for each value of the current slot k, so long as k is strictly less than the number of slots K−1.

In this second implementation of the invention, the coded information IC is then made up in the following manner, as shown in FIG. 7, by combining the components of an M-ary orthogonal basis where M is an integer strictly greater than two:

$$IC = \sum_{k=0}^{K-1} l_k M^k \text{ with } l_k = \sum_{m=0}^{M-1} f \cdot 2^m$$

as the indicator function, e.g. equal to 1.

Each node provides a contribution to a component of the coded information. This coded information combines all of the reception events detected by the concentrator node. Because the bases used are orthogonal, each node can resolve the coded information in unique manner on the two interleaved bases, so as to obtain its contribution to the coded information.

The transmission order of the nodes is deduced from the contribution obtained from the coded information as a function of order relationships established respectively between the K components ($M^k$) corresponding to the slots of the contention window, and the M subcomponents ($2^m$) corresponding to the waveforms.

In this implementation, these order relationships are increasing. In a variant, they could be selected to be decreasing, the important point being that the nodes know them beforehand.

In the example of FIG. 7, it is considered that M is equal to 4. Two waveforms FO1 and FO2 can be used for transmission from the sensor nodes to the concentrator node. The concentrator node CO has detected:
the first waveform FO1 in slot 0;
neither waveform in slot 1;
the first and second waveforms FO1 and FO2 in slot 2;
the first waveform FO1 in slot 3;
the first and second waveforms FO1 and FO2 in slot 4;
neither waveform in slot 5; and
the first waveform FO1 in slot 6.
The resulting components $l_k$ are as follows:

$l_0 = f \times 2^0$; $l_1 = 0$, $l_2 = f \times 2^1 + f \times 2^2$; $l_3 = f \times 2^1$; $l_4 = f \times 2^1 + f \times 2^2$; $l_5 = 0$; $l_6 = f \times 2^1$ thereafter the coded information IC is calculated as follows:

$$IC = 1 \times 4^0 + 0 \times 4^1 + (1+2) \times 4^2 + 1 \times 4^3 + 2 \times 4^4 + 0 \times 4^5 + 1 \times 4^6 =$$
$$1 + 48 + 64 + 256 = 369$$

The sensor node Ni thus determines from the received coded information IC not only the number of slots marked before the slot j that it selected, but also the number of waveforms marked in those slots before its own. It is therefore capable of calculating more accurately its own transmission rank.

In a variant of the above-described second implementation, the concentrator node detects only one waveform from the M predetermined waveforms. Thus, it marks only one waveform per slot k of the contention window. Only those sensor nodes that selected this waveform thus have any chance of winning when participating in the competition mechanism. This makes it possible to limit the number of collisions over a given slot of the transmission period.

Advantageously, in this variant, the sensor node Ni that seeks to transmit data to the concentrator node during the next transmission period selects in random manner the waveform that it is going to use from among the predetermined M waveforms, e.g. in application of a geometrically increasing distribution relationship.

Figure 8:
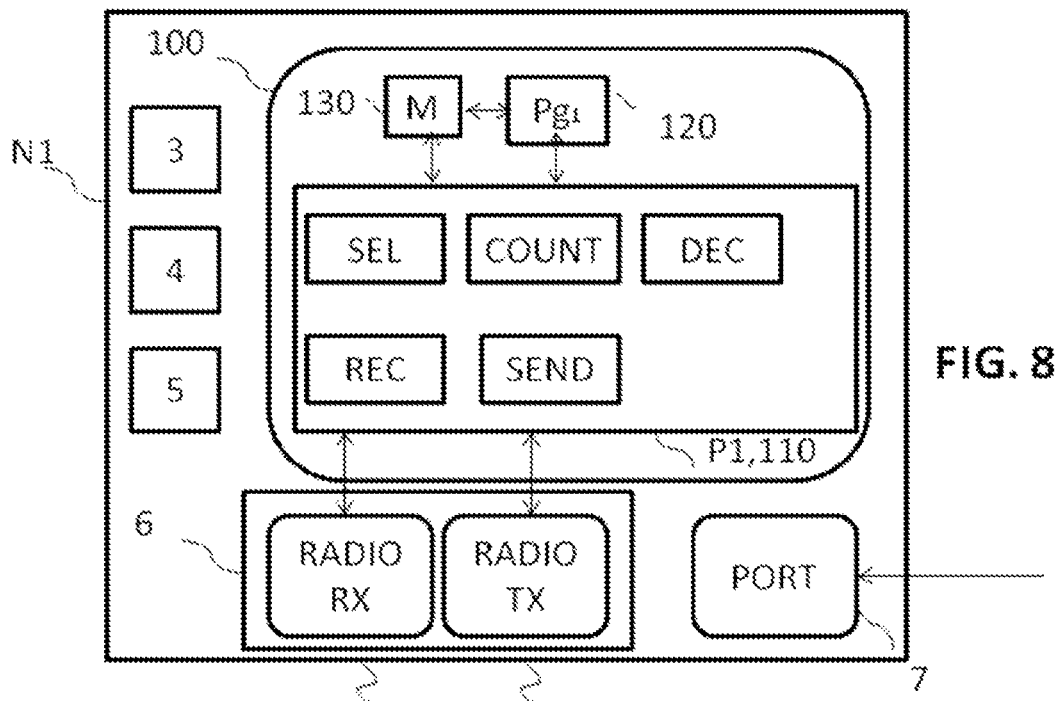
FIG. 8 shows an example of the structure of a communications device in an embodiment of the invention.
Figure 9:
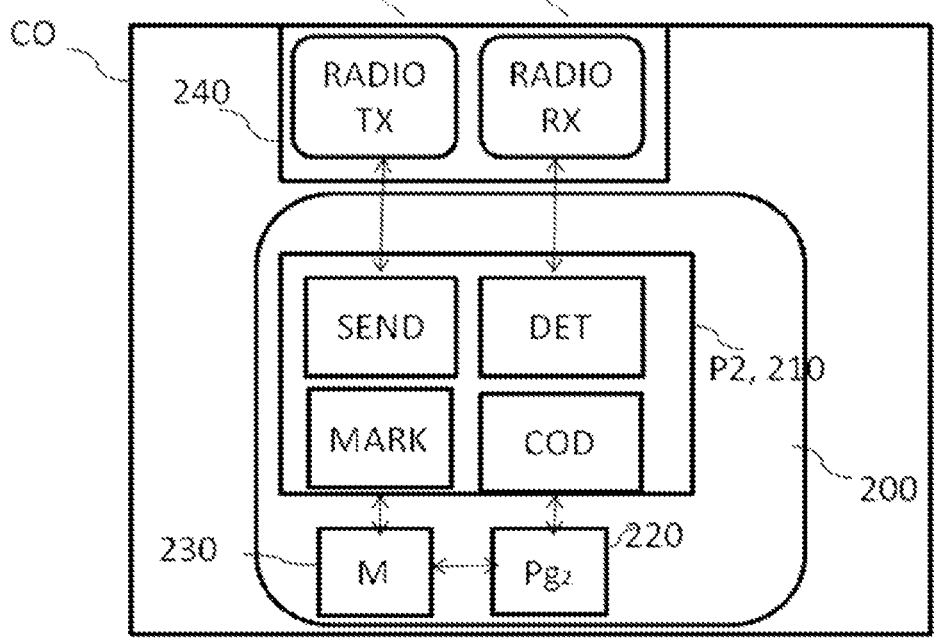
FIG. 9 shows an example of the structure of a management device in an embodiment of the invention.

With reference to FIGS. 8 and 9, consideration is given below to simplified structures for a communications device 100 and for a communications management device 200 in an embodiment of the invention. The communications device 100 performs the communications method of the invention as described above. The management device performs the communications management method of the invention as described above.

By way of example, the device 100 comprises a processor unit 110, e.g. having a processor P1, that is controlled by a computer program $Pg_1$ 120 stored in a memory 130 and performing the communications method of the invention.

On initialization, the code instructions of the computer program $Pg_1$ 120 are loaded for example into a RAM prior to being executed by the processor of the processor unit 110. The processor of the processor unit 110 performs the steps of the above-described communications method in application of the instructions of the computer program 120.

The device 100 has a selector unit SEL for selecting a time slot in a contention window having a plurality of time slots and preceding a transmission period having a plurality of transmission channels, a unit REQ for transmitting a request signal in the selected time slot j to the concentrator node, a unit REC for receiving an answer signal conveying coded information representative of an ordered combination of the slots of the contention window that have been marked as slots during which signals were received by the concentrator node from the plurality of sensor nodes, a unit DET for determining a number of slots marked by the concentrator node in the time slots preceding the time slot j with the help of the received response signal, a unit DEC for deciding to transmit data in the time slot j when the number of slots counted is less than a predetermined threshold.

According to the invention, the communications device 100 is thus arranged to co-operate with a radio transceiver module 6 of the node Ni. In particular, the unit REQ is suitable for causing the request signal REQ to be transmitted in the selected time slot j, and the unit REC is suitable for requesting from this module the signals received during a given time slot, such as for example an answer signal ANSW coming from the concentrator node CO. These units are controlled by the processor P1 of the processor unit 110.

Advantageously, the communications device 100 is incorporated in a node Ni. In a variant, it could be incorporated in an independent module that is connected to the node Ni.

In another variant mentioned with reference to FIG. 1, the computer program $Pg_1$ is stored in the memory 4 and is executed by the processor 3 of the sensor node Ni.

For example, the device 200 may comprise a processor unit 210, e.g. having a processor P2 controlled by a computer program $Pg_2$ 220, stored in a memory 230 and performing the management method of the invention.

On initialization, the code instructions of the computer program $Pg_2$ 220 are loaded for example into a RAM prior to being executed by the processor of the processor unit 210. The processor P2 of the processor unit 210 performs the steps of the above-described management method in application of the instructions of the computer program 220.

In the invention, the management device 200 has a unit DET for detecting a quantity of energy received in a contention window containing a plurality of slots, a unit MARK for marking time slots of the contention window in which a quantity of energy greater than a predetermined energy threshold is detected at the end of the contention window, a unit COD for coding information representative of an ordered combination of marked slots, and a unit SEND for sending an answer signal to a plurality of sensors, said signal conveying said coded information.

These units are controlled by the processor P2 of the processor unit 210.

The unit DET is arranged to co-operate with a radio transceiver module RADIO $RX_{CO}$ suitable for detecting a quantity of energy received during a given time slot. The unit SEND is also arranged to co-operate with the module RADIO $TX_{CO}$ suitable for sending the answer signal to the plurality of sensors, under the control of the unit SEND.

In advantageous manner, the marked slots are stored in the form of a marking table in memory, e.g. in the memory 130 of the management device of the invention.

In an embodiment of the invention, the device 200 is incorporated in a concentrator node CO.

In another embodiment of the invention, the management device 200 is incorporated in an independent module that is connected to the concentrator node.

It can be seen that the above-described methods enable a concentrator node to authorize a plurality of sensor nodes Ni to transmit during a transmission period having a plurality of transmission channels.

Thus, even if the transmission duration needed by a node is shorter than the duration of the transmission period, the available passband can be used by other nodes. Furthermore, the two-part collision avoidance mechanism enables the concentrator node to select those nodes that are authorized to transmit in effective manner.

Because it answers all of the Ni nodes participating in the competition by broadcasting a single answer message that is very short, bandwidth occupation in the transmission channel is minimized.

In a network that presents an architecture that is centralized and that includes a concentrator node suitable for communicating with a plurality of sensor nodes, there exists a need for a communications method that enables a sensor node to obtain access to the communications medium when it seeks to transmit data to the concentrator node.

Another need is to propose a communications method that makes it possible to limit the risk of collisions between a plurality of simultaneous transmissions.

Yet another need is to guarantee that a node can access the medium within a period of time that is compatible with the intended application.

Although the present disclosure has been described with reference to one or more examples, workers skilled in the art will recognize that changes may be made in form and detail without departing from the scope of the disclosure and/or the appended claims.

The invention claimed is:

1. A data communications method executed by a sensor node in a telecommunications network having a plurality of sensor nodes and a concentrator node, said sensor node being suitable for transmitting data to the concentrator node over a broadcast communications medium that it shares with the plurality of sensor nodes, the method comprising the following acts performed when the sensor node has data for transmitting to the concentrator node:

selecting a time slot in a contention window having a plurality of time slots and preceding a transmission period having a plurality of transmission channels;

broadcasting a request signal in the selected time slot;

receiving an answer signal comprising coded information representative of an ordered combination of slots of the contention window marked as slots during which at least one signal was received by the concentrator node;

determining a transmission rank on the basis of the received coded information, which rank is at least a function of the number of slots marked by the concentrator node among the time slots preceding the time slot; and deciding to transmit data in the transmission period when the determined transmission rank is less than or equal to the number of channels of said period.

2. The communications method according to claim 1, wherein the determining act comprises both resolving the received coded information into K components of an M-ary orthogonal basis vector with integer M greater than or equal to 2, of dimension K, with K being a non-zero integer equal to the number of time slots of the contention window, and also interpreting the K components that are obtained, in which the $k^{th}$ slot is interpreted as being marked when the $k^{th}$ component has a value greater than zero.

3. The communications method according to claim 2, wherein, if M has a value equal to 2, the slot is interpreted as being marked, when the $k^{th}$ component has a value equal to 1.

4. The communications method according to claim 2, wherein, if M has a value strictly greater than 2, the request signal broadcast by the sensor node is carried by an $m^{th}$ predetermined waveform from among M predetermined waveforms, and in that the transmission rank is also determined as a function of the number of waveforms received in a given time slot.

5. The communications method according to claim 1, wherein the method includes a prior act of receiving a contention window announcement signal coming from the concentrator node.

6. A method of managing communications in a network comprising a concentrator node and a plurality of sensor nodes, the plurality of sensor nodes being suitable for transmitting data to the concentrator node over a broadcast communications medium that they share, said method being executed by the concentrator node, and comprising the following acts:

listening to the communications medium in order to detect at least one transmission request signal received from at least one of the sensor nodes in a contention window having a plurality of time slots, the at least one transmission request signal being received prior to the concentrator node receiving the data from the at least one sensor node;

marking the time slots of the contention window in which at least one received transmission request signal is detected;

at the end of the contention window, coding information representative of an ordered combination of the marked slots, the information being coded so as to enable each of the at least one sensor node having transmitted a transmission request signal to determine a transmission rank on the basis of the coded information, wherein the rank is at least a function of the number of time slots marked by the concentrator node among the time slots preceding the time slot in which that sensor node transmitted the transmission request signal; and broadcasting an answer signal comprising said coded information.

7. The management method according to claim 6, wherein the coded information is obtained by resolving on an M-ary orthogonal basis of dimension K equal to the number of time slots of the contention window, the $k^{th}$ component being set to a value greater than or equal to 1 when the $k^{th}$ slot is marked, or else being set to zero.

8. The management method according to claim 7, wherein when M has a value equal to 2, the $k^{th}$ component is set to the value 1 when the $k^{th}$ slot is marked, or else it is set to zero.

9. The management method according to claim 7, wherein when M has a value strictly greater than 2, the listening act comprises detecting at least one signal carried by an $m^{th}$ waveform selected from a plurality of M predetermined waveforms, and wherein, in the information coding act, the value of $k^{th}$ component is obtained by an ordered combination of M subcomponents of an orthogonal basis, the $m^{th}$ subcomponent being equal to 1 when the $m^{th}$ waveform has been detected.

10. A device for communicating data via a sensor node of a telecommunications network comprising a plurality of sensor nodes and a concentrator node, said sensor node being suitable for transmitting data to the concentrator node over a broadcast communications medium that it shares with the plurality of sensor nodes, the device being means for implementing the following units when the sensor node has data for transmitting to the concentrator node:

means for selecting a time slot j in a contention window having a plurality of time slots and preceding a transmission period having a plurality of transmission channels;

means for broadcasting a request signal in the selected time slot j;

means for receiving an answer signal comprising coded information representative of an ordered combination of slots of the contention window marked as being slots during which at least one signal was received by the concentrator node;

means for determining a transmission rank on the basis of the received coded information, which rank is determined, at least as a function of a number of slots marked by the concentrator node from among the time slots preceding the time slot j; and means for deciding to transmit data in the transmission period when the determined transmission rank is less than or equal to the number of channels in the transmission period.

11. A device for managing communications in a network comprising a concentrator node and a plurality of sensor nodes, the plurality of sensor nodes being suitable for transmitting data to the concentrator node over a broadcasting communications medium that they share, said device comprising:

means for listening to the communications medium in order to detect at least one transmission request signal received from at least one of the sensor nodes in a contention window having a plurality of time slots, the at least one transmission request signal being received prior to the concentrator node receiving the data from the at least one sensor node;

means for marking the time slots of the contention window in which at least one received transmission request signal is detected;

at the end of the contention window, means for coding information representative of an ordered combination of marked slots, the information being coded so as to enable each of the at least one sensor node having transmitted a transmission request signal to determine a transmission rank on the basis of the coded information, wherein the rank is at least a function of the number of time slots marked by the concentrator node among the time slots preceding the time slot in which that sensor node transmitted the transmission request signal; and means for broadcasting an answer signal comprising said coded information.

12. The device of claim 10, wherein the device is comprised within one of the plurality of sensor nodes.

13. The device of claim 11, wherein the device is comprised within the concentrator node.

14. A non transitory computer-readable storage medium comprising a computer program stored thereon, which comprises instructions for performing 1 a data communications method, when executed by a processor, wherein the method is executed by a sensor node in a telecommunications network having a plurality of sensor nodes and a concentrator node, said sensor node being suitable for transmitting data to the concentrator node over a broadcast communications medium that it shares with the plurality of sensor nodes, the method comprising the following acts performed when the sensor node has data for transmitting to the concentrator node:

selecting a time slot in a contention window having a plurality of time slots and preceding a transmission period having a plurality of transmission channels;

broadcasting a request signal in the selected time slot j;

receiving an answer signal comprising coded information representative of an ordered combination of slots of the contention window marked as slots during which at least one signal was received by the concentrator node;

determining a transmission rank on the basis of the received coded information, which rank is at least a function of the number of slots marked by the concentrator node among the time slots preceding the time slot; and deciding to transmit data in the transmission period when the determined transmission rank is less than or equal to the number of channels of said period.

15. A non transitory computer-readable storage medium comprising a computer program stored thereon, which comprises instructions for performing , a method of managing communications in a network when executed by a processor, the network comprising a concentrator node and a plurality of sensor nodes, the plurality of sensor nodes being suitable for transmitting data to the concentrator node over a broadcast communications medium that they share, said method being executed by the concentrator node, and comprising the following acts:

listening to the communications medium in order to detect at least one transmission request signal received from at least one of the sensor nodes in a contention window having a plurality of time slots, the at least one transmission request signal being received prior to the concentrator node receiving the data from the at least one sensor node;

marking the time slots of the contention window in which at least one received transmission request signal is detected;

at the end of the contention window, coding information representative of an ordered combination of the marked slots, the information being coded so as to enable each of the at least one sensor node having transmitted a transmission request signal to determine a transmission rank on the basis of the coded information, wherein the rank is at least a function of the number of time slots marked by the concentrator node among the time slots preceding the time slot in which that sensor node transmitted the transmission request signal; and broadcasting an answer signal comprising said coded information.

* * * * *